(12) United States Patent
Lan et al.

(10) Patent No.: US 9,694,846 B2
(45) Date of Patent: Jul. 4, 2017

(54) ONLINE LOAD DETECTION DEVICE FOR SELF-BALANCING TWO-WHEEL VEHICLE

(71) Applicant: SHANGHAI NEW CENTURY ROBOT CO., LTD., Shanghai (CN)

(72) Inventors: Tian Lan, Shanghai (CN); Yangbin Chen, Shanghai (CN)

(73) Assignee: Shanghai New Century Robot Co., Ltd., Shanghai (CN)

( * ) Notice: Subject to any disclaimer, the term of this patent is extended or adjusted under 35 U.S.C. 154(b) by 38 days.

(21) Appl. No.: 14/426,463

(22) PCT Filed: Jun. 26, 2013

(86) PCT No.: PCT/CN2013/077989
§ 371 (c)(1),
(2) Date: Mar. 6, 2015

(87) PCT Pub. No.: WO2014/036852
PCT Pub. Date: Mar. 13, 2014

(65) Prior Publication Data
US 2015/0239499 A1    Aug. 27, 2015

(30) Foreign Application Priority Data

Sep. 6, 2012   (CN) .......................... 2012 1 0326838

(51) Int. Cl.
*B62D 6/04* (2006.01)
*G01M 17/007* (2006.01)
(Continued)

(52) U.S. Cl.
CPC .............. *B62D 6/04* (2013.01); *B62D 11/003* (2013.01); *B62D 61/00* (2013.01); *B62K 11/007* (2016.11);
(Continued)

(58) Field of Classification Search
CPC ........ B62D 6/04; B62D 61/00; B62D 11/003; G07C 5/08; G01M 17/007
See application file for complete search history.

(56) References Cited

U.S. PATENT DOCUMENTS 8,225,891 B2 *   7/2012   Takenaka ............... B62K 3/007
                                          180/7.1
2008/0147281 A1   6/2008   Ishii et al.
(Continued)

FOREIGN PATENT DOCUMENTS

| CN | 2256531 Y | 6/1997 |
| CN | 201824899 U | 5/2011 |

(Continued)

OTHER PUBLICATIONS

International Search Report dated Oct. 10, 2013 for Application No. PCT/CN2013/077989.
(Continued)

*Primary Examiner* — Jerrah Edwards
*Assistant Examiner* — Majdi Alsomiri
(74) *Attorney, Agent, or Firm* — Ladas & Parry LLP (57) ABSTRACT

An online load detection device for a self-balancing two-wheel vehicle, comprising a support platform load detection device: the support platform load detection device comprises at least a group of magnetic detection devices; each group of magnetic detection devices comprise a permanent magnet and a magnetic sensor; the permanent magnet is supported on a support platform via an elastic member; the magnetic sensor is disposed in the easing of the support platform, and is used to detect the magnetic field change caused by the relative displacement between the permanent magnet and the magnetic sensor and output a detection signal. The detection device further comprises a seat pressure sensor disposed on a seat. The detection device detects the load pressure of the support platform in a non-contact manner, (Continued)

and can avoid wear, judge and warn the driving attitude of a driver.

13 Claims, 5 Drawing Sheets

(51) Int. Cl.
  *G07C 5/08* (2006.01)
  *B62D 61/00* (2006.01)
  *B62D 11/00* (2006.01)
  *G01G 3/12* (2006.01)
  *G01G 19/12* (2006.01)
  *G01L 1/22* (2006.01)
  *G01G 7/02* (2006.01)
  *B62K 11/00* (2006.01)

(52) U.S. Cl.
  CPC ............... *G01G 3/12* (2013.01); *G01G 7/02* (2013.01); *G01G 19/12* (2013.01); *G01L 1/22* (2013.01); *G01M 17/007* (2013.01); *G07C 5/08* (2013.01)

(56) References Cited

U.S. PATENT DOCUMENTS

| | | | | |
|---|---|---|---|---|
| 2008/0164083 A1* | 7/2008 | Miki | ............... | B60L 15/20 180/165 |
| 2009/0288900 A1 | 11/2009 | Takenaka et al. | | |
| 2010/0250040 A1* | 9/2010 | Yamano | ............... | B62K 3/007 701/22 |
| 2010/0292840 A1* | 11/2010 | Ruan | ............... | B25J 5/007 700/259 |
| 2012/0166048 A1 | 6/2012 | Inoue et al. | | |
| 2015/0239521 A1* | 8/2015 | Fang | ............... | B62K 3/007 180/6.48 |

FOREIGN PATENT DOCUMENTS

| | | |
|---|---|---|
| CN | 202420852 U | 9/2012 |
| CN | 102798448 A | 11/2012 |
| JP | 2010-30569 A | 2/2010 |
| WO | 2011/033592 A1 | 3/2011 |

OTHER PUBLICATIONS espacenet English abstract of CN 201824899 U.
espacenet English abstract of CN 202420852 U.
espacenet English abstract of CN 102798448 A.
espacenet English abstract of CN 2256531 Y.
espacenet English abstract of JP 2010-30569 A.
Li, Xuemei, "Preparation of $LiNbO_3$ piezoelectric film and study on detecting thenar pressure application thereof", Engineering Science and Technology 1, Feb. 15, 2009, No. 2, pp. 44-46.

* cited by examiner

ONLINE LOAD DETECTION DEVICE FOR SELF-BALANCING TWO-WHEEL VEHICLE

CROSS-REFERENCE TO RELATED APPLICATION

This U.S. application claims priority under 35 U.S.C. 371 to, and is a U.S. National Phase application of, the International Patent Application No. PCT/CN2013/077989, filed 26 Jun. 2013, which claims the benefit of prior Chinese Application No. 201210326838.0 filed 06 Sep. 2012. The entire contents of the above-mentioned patent applications are incorporated by reference as part of the disclosure of this U.S. application.

FIELD OF THE INVENTION

The present invention relates to an online load detection device for a self-balancing two-wheel vehicle.

BACKGROUND

Figure 1:
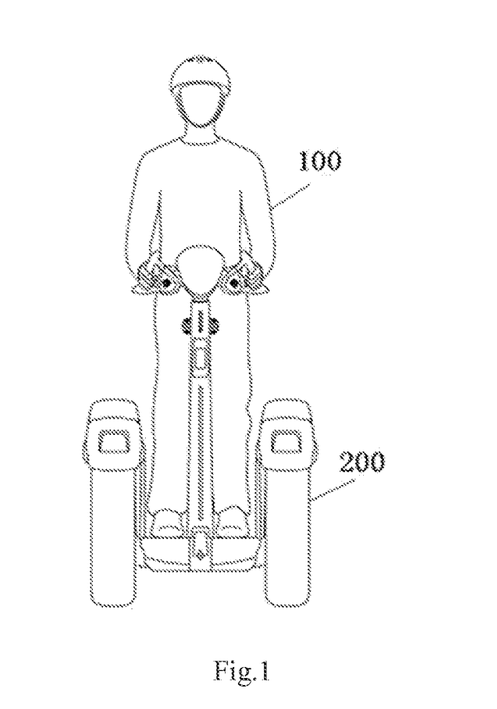
FIG. 1 is a diagram of driver driving the self-balancing two-wheel vehicle.

The self-balancing two-wheel vehicle is an environmental protection traffic tool, and its power supplied by storage battery. The center of gravity of the self-balancing two-wheel vehicle is arranged above the wheel axle, two wheels are arranged parallelly and coaxially, and driven by a servo motor respectively, FIG. 1 is a diagram of driver 100 driving the self-balancing two-wheel vehicle 200. In uncontrolled state, this system is an instability system. When the system work normally, controller receives the information of the vehicle posture sensor, and control the action of servo motor according to the operational principle of an inverted pendulum system, therefore, maintain a dynamic balance. When the center of gravity of the driver 100 and the self-balancing two-wheel vehicle 200 incline forward, an inner servo motor of the vehicle can bring a forward force, one hand, balance the moment caused by the forward incline of the driver and vehicle, the other hand, bring a forward acceleration to maintain the balance of vehicle. On the contrary, when the center of gravity of the driver 100 inclines backward, the servo motor will brings a backward force to get balance. Therefore, so long as the driver inclines forward or backward, the self-balancing two-wheel vehicle will move forward or backward.

The load of vehicle and the situation of road affect the operation performance of the vehicle greatly, a pressure sensor is arranged on the surface of the support platform of the self-balancing two-wheel vehicle 200 to detect the load, however, the pressure sensor is in contact with person, thus it is easy to wear. Furthermore, the self-balancing two-wheel vehicle can not weigh the load, so the requirement of the weight of the driver is strictly, thus the person too light or too heavy can not drive the vehicle.

CONTENTS OF THE INVENTION

The problem to be solved is providing an online load detection device for a self-balancing two-wheel vehicle. The detection device detects the load pressure of the support platform in a non-contact manner, and can avoid wear, and prolong the service life.

A further problem to be solved is providing an online load detection device for a self-balancing two-wheel vehicle, which can weigh the load on the vehicle to judge the operation state.

The solution of the present invention is providing an online load detection device for a self-balancing two-wheel vehicle, the vehicle includes a support platform which comprises a casing, characterized in that the online load detection device for a self-balancing two-wheel vehicle includes a support platform load detection device. The support platform load detection device comprises at least a group of magnetic detection devices, each group of magnetic detection devices comprises a permanent magnet and a magnetic sensor; the permanent magnet is supported on a support platform via an elastic member to bear the load pressure; the magnetic sensor is disposed in the casing of the support platform, and is used to detect the magnetic field change caused by the relative displacement between the permanent magnet and the magnetic sensor and output a detection signal.

The said online load detection device for a self-balancing two-wheel vehicle further includes a central controller. The central controller is used to receive detection signal outputted by the magnetic sensor of the support platform load detection device, and determine the press state of the platform of the self-balancing two-wheel vehicle.

The advantages of the present invention are as below:

1. The device of the present invention can detect the load pressure of the support platform. When the support platform is applied with a certain load, compression deformation of the elastic element positioned under the permanent magnet will take place, and result the relative displacement between the permanent magnet and the magnetic sensor, and change the magnetic field acting on the magnetic sensor, so that change the output voltage of the magnetic sensor. The amount of the compression deformation of the elastic element (i.e. relative displacement between the permanent magnet and the magnetic sensor) is in direct proportion to the load pressure. However, the output voltage of the magnetic sensor is in inverse proportion to the relative displacement between the permanent magnet and the magnetic sensor, therefore the magnetic sensor can be used to detect value of the load pressure.
2. The magnetic sensor of present invention is provided in the casing of the support platform, does not contact with load, no wear, difficult to be damaged, and has long service life.
3. By comprehensive calculation of the pressure which detected, the present invention can detect and judge the existence of person, the driving posture of driver when the vehicle straight ahead and turn around, and the free fall or parabola moving of vehicle. With the said judgment, the central controller of the self-balancing two-wheel vehicle can give suggestion or operating safely, therefore convenient for driver to know about the driving state, and ensure the safe of the driver during driving.
4. The support platform of the self-balancing two-wheel vehicle of the present invention is provided with seat, the seat is made of elastic materials for example foaming material. The seat is provided with seat pressure sensor, and the said sensor may be film pressure sensor. When someone sits on the seat, the gravity of person applies pressure to the sensor of foaming material, and the pressure will disappear after someone leaving. The film pressure sensor can detect the said pressure and detect whether someone is sitting on the seat or not according to the standard pressure, and at the same time weigh the person.

BRIEF DESCRIPTION OF THE FIGURES

The present invention will be expressed according to the figures.

DETAILED DESCRIPTION OF PREFERRED EMBODIMENTS

Figure 2:
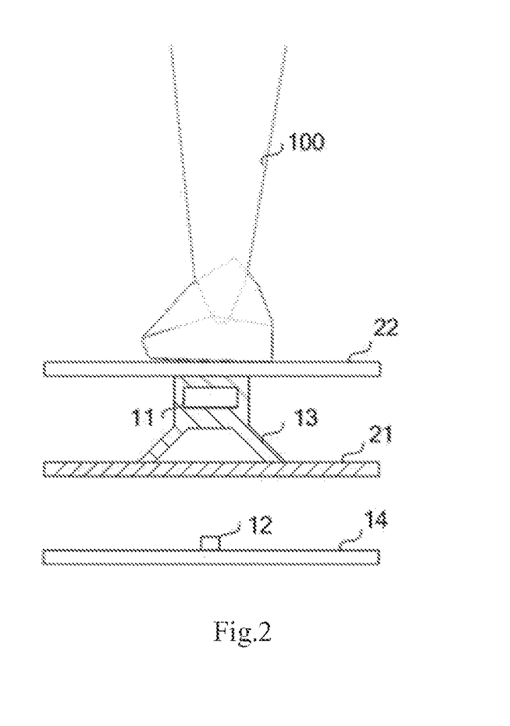
FIG. 2 is a diagram of the detection principle of the magnetic detection device of one embodiment of the invention.
Figure 3:
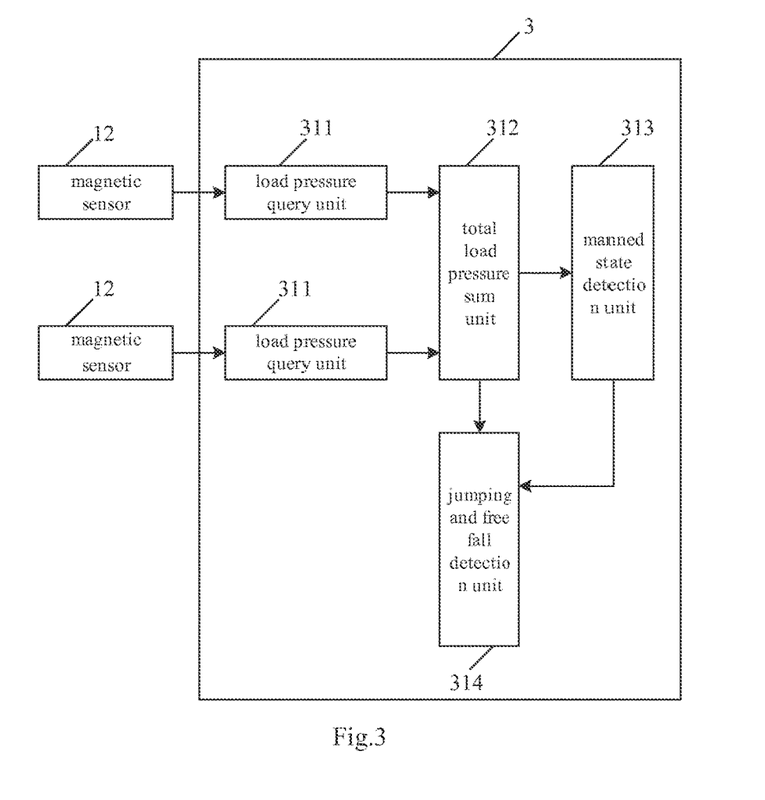
FIG. 3 is a principle block diagram of one embodiment of the online load detection device for a self-balancing two-wheel vehicle.

According to FIG. 2 and FIG. 3, one embodiment of the online load detection device for a self-balancing two-wheel vehicle of the invention includes a support platform load detection device. The support platform load detection device comprises at least a group of magnetic detection devices, each group of magnetic detection devices comprise a permanent magnet 11 and a magnetic sensor 12; the permanent magnet 11 is supported on a support platform 21 via an elastic member to bear the load pressure. The support platform 21 includes a casing, the magnetic sensor 12 is disposed in the casing of the support platform 21 opposed to the permanent magnet 11, and is used to detect the magnetic field change caused by the relative displacement between the permanent magnet 11 and the magnetic sensor 12 and output a detection signal.

The permanent magnet 11 may be alnico, the magnetic sensor 12 may be dry reed tube, eddy current type sensor, hall sensor, giant magnetoresistive sensor or magnetoresistive sensor etc. The elastic member may be made from elastic materials, for example a spring and so on. In the embodiment shown in FIG. 2, an elastic cushion 13 is provided on the support platform 21, the elastic cushion 13 is made of elastic material. The permanent magnet 11 is provided inside the elastic cushion 13, and part of the elastic cushion 13 is positioned under the permanent magnet 11 to act as the elastic element. When a user stands on the load platform 22, the elastic cushion 13 provided on the upper surface of the support platform 21 elastically deforms, leading the permanent magnet 11 provided inside of it to move in a downward direction toward the ground. When the user steps off of the load platform 22, the elastic cushion 13 will return to its normal state, leading the permanent magnet 11 to move upward away from the ground. The magnetic sensor 12 provided on the circuit board 14 can detect the change of the magnetic field caused by the movement of the permanent magnet 11 with respect to the magnetic sensor 12, and can determine the extent of the deformation of the elastic cushion 13 according to the extent of the change of the magnet field. Therefore, the support platform load detection device can detect whether a user is standing on the self-balancing two-wheel vehicle or not, and can additionally also weigh the user.

Preferred, the online load detection device for a self-balancing two-wheel vehicle of the present invention further includes a central controller 3. The central controller 3 is used to receive detection signal outputted by the magnetic sensor of the support platform load detection device, and determine the press state of the platform of the self-balancing two-wheel vehicle.

In the embodiment shown in FIG. 3, the said central controller 3 further includes at least one load pressure query unit 311 corresponding to the at least one group of magnetic detection devices, each load pressure query unit 311 obtains the pressure value of the permanent magnet by querying the prestored voltage-pressure curve expressing the relationship between the output voltage of the magnetic sensor 12 and the pressure applied on the permanent magnet 11 according to the detection signal outputted by the magnetic sensor 12 of the support platform load detection device.

In a preferred embodiment, the central controller 3 further includes a total load pressure sum unit 312 and a manned state detection unit 313 to get the weight of the load applied on the vehicle, thus use weight to adjust the control parameter of the self-balancing two-wheel vehicle and make the operation of the vehicle is optimal. The total load pressure sum unit 312 sums all of the pressure value obtained from the load pressure query unit 311 to obtain the total load pressure value $\Sigma F$. The manned state detection unit 313 compares the total load pressure value $\Sigma F$ which received by the total load pressure sum unit 312 with the preset manned threshold (for example 20 kg), if $\Sigma F \geq G1$, it can determine that the driver is on the self-balancing two-wheel vehicle. Therefore, $\Sigma F$ is the weight of load, the central controller 3 can make the driving performance of the vehicle in optimal state according to the control parameter of the weight adjust system.

Because the self-balancing two-wheel vehicle controls the action of servo motor according to the operational principle of an inverted pendulum system, therefore, maintain a dynamic balance of the vehicle. When the center of gravity of the driver and the vehicle incline forward, an inner servo motor of the vehicle can bring a force forward, one hand, balance the moment caused by the incline forward of the person and vehicle, the other hand, bring an acceleration forward to maintain the balance of vehicle. On the contrary, when the center of gravity of the driver inclines backward, the servo motor brings a force backward to get balance. When the self-balancing two-wheel vehicle is free fall or parabola moving, the posture sensor may be detect the posture of incline forward, the control system will make the wheel turning forward quickly to maintain balance. If the posture sensor detect the posture of incline backward, the control system will make the wheel turning backward quickly to maintain balance. Because the wheels is hung in the air and in no load state, the wheels may be turning forward or backward too quickly, thus the vehicle will lose balance at the moment that the tyre being in contact with ground and result turnover. In addition, when the vehicle in the form of process, if you encounter unexpected situations, the driver is likely to make a jumping action, this time two-wheel vehicle in unmanned state, is likely to cause speed. In a preferred embodiment, the central controller further includes a jumping and free fall detection unit 314 used to receive detection result of the manned state detection unit 313 and calculate result of the sum total load pressure unit 312, after the manned state detection unit 313 determining that the driver is on the self-balancing two-wheel vehicle, timing begins when the total load pressure ΣF is less than the preset load threshold G2 (for example 0.3 kg), if the time that ΣF maintaining less than G2 does not less than preset time threshold T1 (for example 2 seconds), it can determine that the driver leaved the vehicle; if the time that ΣF maintaining less than G2 is less than preset time threshold T1, the vehicle is in the free fall or parabola operation state, thus realize a further control and maintain or reduce the wheels speed to prevent the attack of the wheels landing from losing balance.

Figure 4:
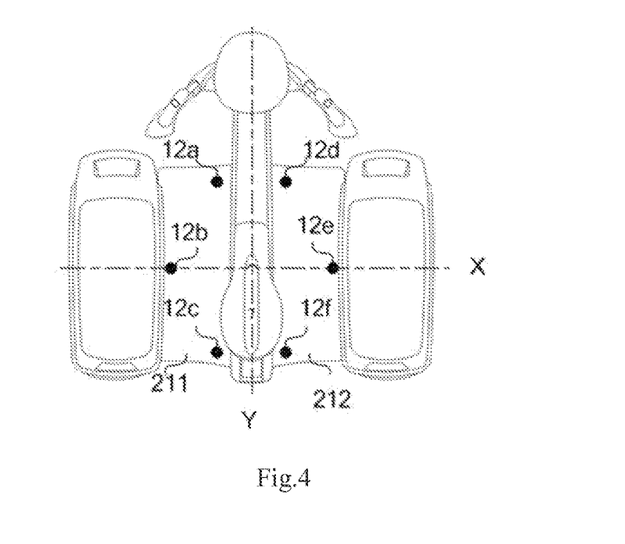
FIG. 4 is a diagram of the arrangement of another embodiment of a magnetic sensor of the invention.
Figure 5:
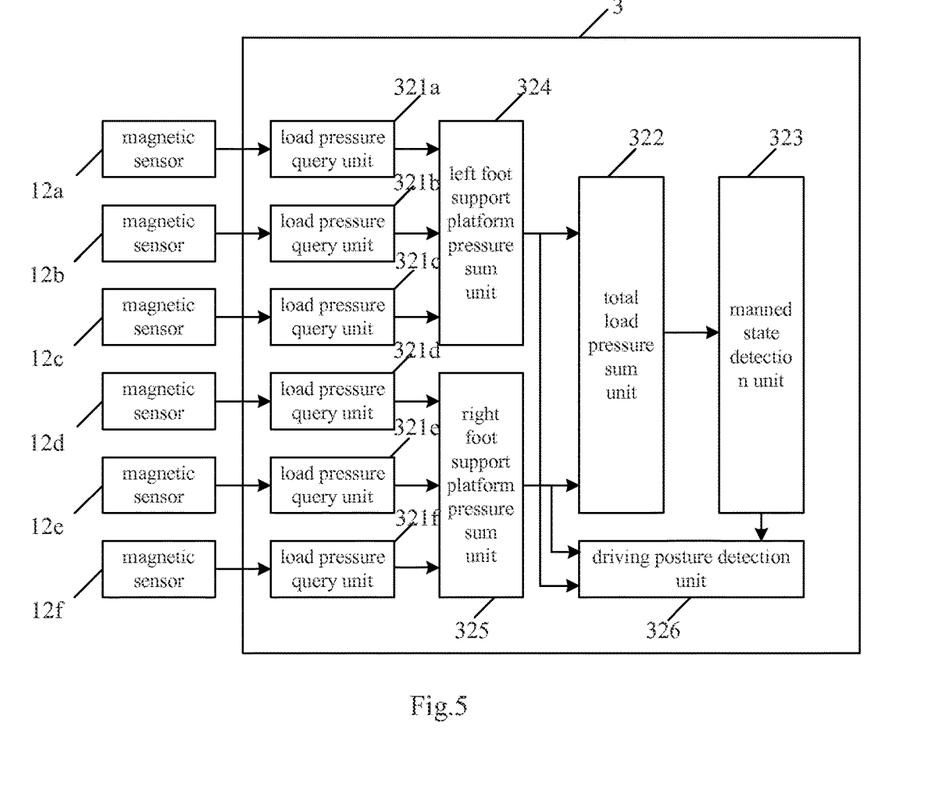
FIG. 5 is a principle block diagram of a second embodiment of the online load detection device for a self-balancing two-wheel vehicle.

In another embodiment shown in FIG. 4 and FIG. 5, the support platform 21 includes a left foot support platform 211 and a right foot support platform 212. The said support platform load detection device includes left foot support platform load detection device and right foot support platform load detection device, both the left and right foot support platform load detection device include at least one group of said magnetic detection devices, wherein the magnetic sensor of the left foot support platform load pressure detection device is provided in the casing of the left foot support platform 211, and the magnetic sensor of the right foot support platform load pressure detection device is provided in the casing of the right foot support platform 212.

More specifically, considering that the area of a single magnetic sensor is small, as shown in FIG. 4, both left foot support platform load detection device and right foot support platform load detection device include three groups of magnetic detection devices. Three magnetic sensor 12a, 12b and 12c are provided in the casing of the left foot support platform 211. Three magnetic sensor 12d, 12e and 12f are provided in the casing of the right foot support platform 212. Magnetic sensor 12b and 12e are arranged on the transverse axis X of the vehicle. Magnetic sensor 12a and 12c are symmetrical about the transverse axis X, magnetic sensor 12d and 12f are also symmetrical about the transverse axis X. Magnetic sensor 12a, 12b, 12c are symmetrical to 12d, 12e and 12f, and respectively arranged on two sides of longitudinal axis Y. Person skilled in the art should understand, FIG. 4 is only an example, the magnetic sensor may be other suitable number or arrangement manner.

As shown in FIG. 5, the central controller includes six load pressure query units 321a-321f corresponding to six groups of magnetic detection devices, a left foot support platform pressure sum unit 324, a right foot support platform pressure sum unit 325, a total load pressure sum unit 322 and a manned state detection unit 323. Each load pressure query unit obtains the pressure value of the permanent magnet by querying the prestored voltage-pressure curve expressing the relationship between the output voltage of the magnetic sensor and the pressure applied on the permanent magnet according to the detection signal outputted by the magnetic sensor of the support platform load detection device. The left foot support platform pressure sum unit 324 sums the pressure values obtained from all load pressure query units 321a-321c corresponding to the left foot support platform load pressure detection device to get F1. The right foot support platform pressure sum unit 325 used to sum the pressure values obtained from all load pressure query units 321d-321f corresponding to the right foot support platform load pressure detection device to get F2. The total load pressure sum unit 322 sum F1 and F2 to the get total load pressure ΣF. The manned state detection unit 323 compares ΣF with the preset manned threshold G1, if ΣF≥G1, the driver is on the self-balancing two-wheel vehicle.

Because of different position of two foot and different weight distributed on two foot during the driver standing on the vehicle, the difference of pressure on two support platforms are great, the vehicle is easy to rollover when turning, is not conducive to the drive safety. To detect this situation, in a preferred embodiment, the central controller is further includes a driving posture detection unit 326 which is used to receive the detection result of the manned state detection unit 323, when the manned state detection unit 323 determine that the driver is on the vehicle, compares the absolute value of the difference between F1 and F2 with the preset driving posture threshold G3 (for example 3/10 of avoirdupois), if the absolute value of the difference between F1 and F2 does not less than G3, the driving posture of the driver is incorrect, therefore reminds the driver to distribute avoirdupois on feet reasonably.

Figure 6:
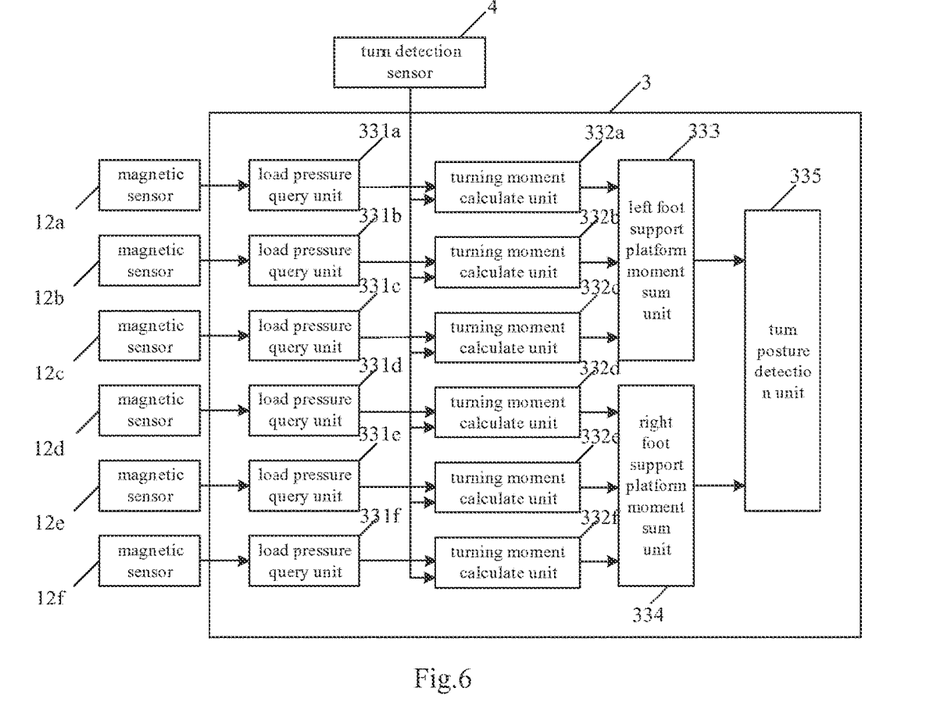
FIG. 6 is a principle block diagram of a third embodiment of the online load detection device for a self-balancing two-wheel vehicle.

Because the center of gravity of the self-balancing two-wheel vehicle is higher, when the vehicle turns, if speed is to high, the wheel on the turning side may be out of the ground by the effect of centrifugal force, and thus rollover. To detect the driving posture during turning, in another embodiment of the invention as shown in FIG. 6, the online load detection device for a self-balancing two-wheel vehicle further includes a turn detection sensor 4 which send a turn signal to the central controller, when the turning of the self-balancing two-wheel vehicle is detected by the turn detection sensor 4. The central controller 3 further includes at least one load pressure query unit corresponding to the at least one group of magnetic detection devices, at least one turning moment calculate unit, one left foot support platform moment sum unit, one right foot support platform moment sum unit and one turn posture detection unit corresponding to the load pressure query unit. In an embodiment shown in FIG. 6, the central controller 3 includes six load pressure query units 331a-331f corresponding to the magnetic detection devices shown in FIG. 4 and six turning moment calculate units 332a-332f corresponding to the six load pressure query units 331a-331f. Each load pressure query unit get the pressure value of the permanent magnet by querying the prestored voltage-pressure curve expressing the relationship between the output voltage of the magnetic sensor and the pressure applied on the permanent magnet according to the detection signal outputted by the magnetic sensor of the support platform load detection device. Each turning moment calculate unit is used to receive the turning signal of the turn detection sensor 4, and when the signal is received, multiply the pressure value of the load pressure query unit by the preset value of the arm of force (as shown in FIG. 4, the arm of force is the vertical distance between magnetic sensor and longitudinal axis Y) to get moment value. The left foot support platform moment sum unit 333 sum the moment values of all turning moment calculate units 332a-332c corresponding to the left foot support platform load pressure detection device to get M1. The right foot support platform moment sum unit 334 sum the moment values of all turning moment calculate units 332d-332f corresponding to the right foot support platform load pressure detection device to get M2. The turn posture detection unit 335 compares the absolute value of the difference between M1 and M2 with the turn posture threshold G4, if it does not less than G4, the driving posture of the driver is incorrect, therefore, further remind the driver or adjust speed and turning sensitivity automatically to ensure drive safely.

Figure 7:
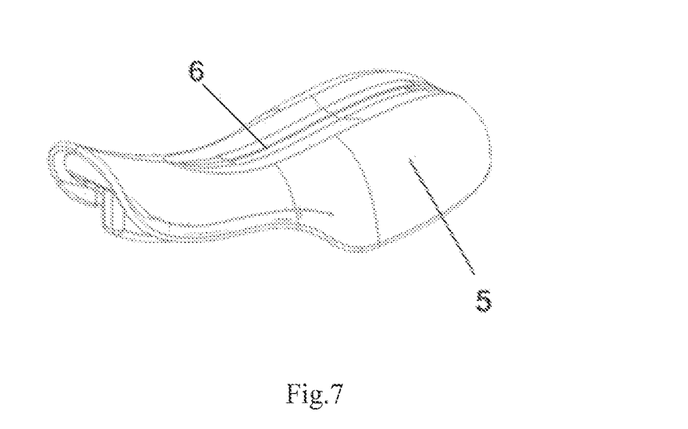
FIG. 7 is a diagram of one embodiment of a seat of the invention.
Figure 8:
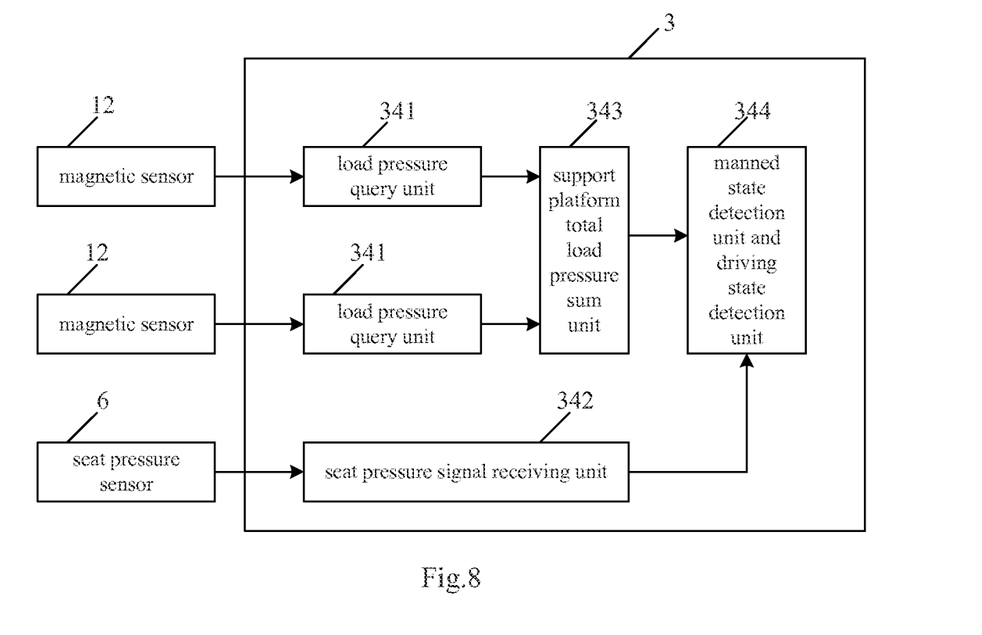
FIG. 8 is a principle block diagram of a fourth embodiment of the online load detection device for a self-balancing two-wheel vehicle.

In another embodiment shown in FIG. 7 to FIG. 8, the self-balancing two-wheel vehicle can be used for standing and sitting. The self-balancing two-wheel vehicle is provided with seat on the support platform. In this embodiment, besides the support platform load detection device said above, the online load detection device for a self-balancing two-wheel vehicle further includes a seat pressure sensor 6. Preferably, the seat 5 is made of elastic materials for example foaming material. The said sensor 6 is a film pressure sensor. When someone sit on the seat, the gravity of person applies pressure to the film pressure sensor of foaming material, and the pressure will disappear after someone leaving. The film pressure sensor can detect the said pressure and detect whether someone is sitting: on the seat or not according to the standard pressure, and at the same time weigh the person.

In a preferred embodiment shown in FIG. 8, the online load detection device for a self-balancing two-wheel vehicle further includes a central controller 3, the central controller 3 includes at least one load pressure query unit 341 corresponding to the at least one group of magnetic detection devices, a seat pressure signal receiving unit 342, a support platform total load pressure sum unit 343, manned state detection unit and driving state detection unit 344. Each load pressure query unit 341 obtains the pressure value of the permanent magnet by querying the prestored voltage-pressure curve expressing the relationship between the output voltage of the magnetic sensor and the pressure applied on the permanent magnet according to the detection signal outputted by the magnetic sensor of the support platform load detection device. The seat pressure signal receiving unit 342 used to receive the seat load pressure $\Sigma F2$ detected by the seat pressure sensor.

The support platform total load pressure sum unit 343 sum pressure values obtained from all load pressure query units to obtain the total load pressure $\Sigma F1$ of the support platform. The manned state and driving state detection unit sum $\Sigma F1$ and $\Sigma F2$ to get total load pressure $\Sigma F$ of the support platform, and compares $\Sigma F$ with the preset manned threshold G1, if $\Sigma F \geq G1$, it can determine that the driver is on the self-balancing two-wheel vehicle, then compares F2 with the preset manned threshold G1, if $\Sigma F2 < G1$, the driver is in standing posture; if $\Sigma F2 \geq G1$, the driver is in sitting posture.

INDUSTRIAL PRACTICABILITY

The device of the present invention can detect the load pressure of the support platform in noncontact manner, thus avoid wear of load detection device, and prolong the service life of the load detection device.

The invention claimed is:

1. A support platform load detection device for a self-balancing two-wheel vehicle, said self-balancing two-wheel vehicle comprises a load platform and a casing, said support platform load detection device comprising:
    a support platform and at least one elastic cushion;
    at least one group of magnetic detection devices, the at least one group of magnetic detection devices comprising a permanent magnet and a magnetic sensor;
    wherein the permanent magnet is encased inside an elastic cushion, and wherein the elastic cushion is configured to deform when a load is applied to the load platform of the self-balancing two-wheel vehicle; and
    wherein the magnetic sensor is disposed on the casing of the self-balancing two-wheel vehicle, and is configured to detect a magnetic field change resulting from a relative displacement between the permanent magnet and the magnetic sensor, and is further configured to output a detection signal.

2. The support platform load detection device for a self-balancing two-wheel vehicle according to claim 1, wherein the magnetic sensor is dry reed tube, eddy current type sensor, hall sensor, giant magnetoresistive sensor or magnetoresistive sensor.

3. The support platform load detection device for a self-balancing two-wheel vehicle according to claim 1, further comprising a central controller configured to receive the detection signal from the magnetic sensor, and configured to determine a compression state of the load platform of the self-balancing two-wheel vehicle according to the detection signal.

4. The support platform load detection device for a self-balancing two-wheel vehicle according to claim 3, wherein said central controller comprises:
    at least one load pressure query unit corresponding to the at least one group of magnetic detection devices, each load pressure query unit is configured to receive a pressure value of the permanent magnet by querying a pre-stored voltage-pressure curve expressing the relationship between the output voltage of the magnetic sensor and the pressure applied on the permanent magnet according to the detection signal outputted by the magnetic sensor.

5. The support platform load detection device for a self-balancing two-wheel vehicle according to claim 4, wherein said central controller further comprises:
    a total load pressure sum unit configured to sum all of the pressure values obtained from the load pressure query unit to obtain a total load pressure value $\Sigma F$;
    a manned state detection unit configured to compare the total load pressure value $\Sigma F$ with a preset manned threshold G1 for determining whether a driver is on the self-balancing two-wheel vehicle.

6. The support platform load detection device for a self-balancing two-wheel vehicle according to claim 5, wherein said central controller further comprises:
    a jumping and free fall detection unit configured to receive a detection result of the manned state detection unit and to calculate a sum of the total load pressure after the manned state detection unit has determined that the driver is on the self-balancing two-wheel vehicle,
    wherein a timing begins when the total load pressure $\Sigma F$ is less than the preset load threshold G2, if the timing that $\Sigma F$ is less than G2 is not less than a preset time threshold T1, it is determined that the driver has left the vehicle; if the timing that $\Sigma F$ is less than G2 is less than a preset time threshold T1, it is determined that the vehicle is in a free fall or parabola operation state.

7. The support platform load detection device for a self-balancing two-wheel vehicle according to claim 3, wherein
    said support platform includes a left foot support platform and a right foot support platform;
    wherein the left and right foot support platforms each include at least one group of magnetic detection devices, each group of magnetic detection devices comprising a permanent magnet and a magnetic sensor;
    wherein the magnetic sensor of the left foot support platform is provided on a casing of the left foot support platform, and the magnetic sensor of the right foot support platform is provided on a casing of the right foot support platform.

8. The support platform load detection device for a self-balancing two-wheel vehicle according to claim 7, wherein said central controller includes:

at least one load pressure query unit corresponding to the at least one group of magnetic detection devices, each load pressure query unit is configured to receive a pressure value of the permanent magnet by querying a pre-stored voltage-pressure curve expressing the relationship between the output voltage of the magnetic sensor and the pressure applied on the permanent magnet according to the detection signal outputted by the magnetic sensor of the support platform load detection device;

a left foot support platform pressure sum unit configured to sum the pressure values obtained from all load pressure query units corresponding to the left foot support platform to obtain F1;

a right foot support platform pressure sum unit configured to sum the pressure values obtained from all load pressure query units corresponding to the right foot support platform to obtain F2;

a total load pressure sum unit to sum F1 and F2 to obtain a total load pressure $\Sigma F$;

a manned state detection unit configured to compare $\Sigma F$ with a preset manned threshold G1 for determining whether a driver is on the self-balancing two-wheel vehicle.

9. The support platform load detection device for a self-balancing two-wheel vehicle according to claim 8, wherein said central controller further includes a driving posture detection unit used to receive a detection result of the manned state detection unit, when the manned state detection unit determines that the driver is on the vehicle, the manned state detection unit compares the absolute value of the difference between F1 and F2 with a preset driving posture threshold G3, and if the absolute value of the difference between F1 and F2 is not less than G3, the driving posture of the driver is incorrect.

10. The support platform load detection device for a self-balancing two-wheel vehicle according to claim 7, further comprising a turn detection sensor configured to send a turn signal to the central controller when the turning of the self-balancing two-wheel vehicle is detected by the turn detection sensor; the central controller further includes:

at least one load pressure query unit corresponding to the at least one group of magnetic detection devices, each load pressure query unit is configured to receive the pressure value of the permanent magnet by querying a pre-stored voltage-pressure curve expressing the relationship between the output voltage of the magnetic sensor and the pressure applied on the permanent magnet according to the detection signal outputted by the magnetic sensor;

at least one turning moment calculate unit corresponding to the at least load pressure query unit, each turning moment calculate unit is configured to receive the turning signal of the turn detection sensor, and when the signal is received, is configured to multiply the pressure value of the load pressure query unit by a preset value of an arm of force to get moment value;

a left foot support platform moment sum unit configured to sum the moment values of all turning moment calculate units corresponding to the left foot support platform to obtain M1;

a right foot support platform moment sum unit configured to sum the moment values of all turning moment calculate units corresponding to the right foot support platform to obtain M2;

a turn posture detection unit configured to compare the absolute value of the difference between M1 and M2 with a turn posture threshold G4, if the difference between M1 and M2 is not less than G4, the driving posture of a driver of the self-balancing two-wheel vehicle is incorrect.

11. The support platform load detection device for a self-balancing two-wheel vehicle according to claim 7, wherein said load platform of the self-balancing two-wheel vehicle is provided with seats for a person to sit on, and the support platform load detection device further includes a seat pressure sensor provided on said seats.

12. The support platform load detection device for a self-balancing two-wheel vehicle according to claim 11, wherein
the seats are made of elastic materials; and
the seat pressure sensor is a film pressure sensor.

13. The support platform load detection device for a self-balancing two-wheel vehicle according to claim 11, further comprising a central controller which comprises:

at least one load pressure query unit corresponding to the at least one group of magnetic detection devices, each load pressure query unit is configured to receive the pressure value of the permanent magnet by querying a pre-stored voltage-pressure curve expressing the relationship between the output voltage of the magnetic sensor and the pressure applied on the permanent magnet according to a detection signal outputted by the magnetic sensor of the support platform load detection device;

a seat pressure signal receiving unit configured to receive a seat load pressure $\Sigma F2$ detected by the seat pressure sensor;

a support platform total load pressure sum unit configured to sum pressure values obtained from all load pressure query units to obtain a total load pressure $\Sigma F1$ of the support platform;

a manned state and driving state detection unit configured to sum $\Sigma F1$ and $\Sigma F2$ to get a total load pressure $\Sigma F$ of the support platform, and configured to compare the $\Sigma F$ with G1 and to compare $\Sigma F2$ with G1, if $\Sigma F \geq G1$, the driver is on the self-balancing two-wheel vehicle, if $\Sigma F2 < G1$, the driver is in standing posture;

if $\Sigma F2 \geq G1$, the driver is in sitting posture.

* * * * *